US011595614B1

(12) United States Patent
Mahyar et al.

(10) Patent No.: US 11,595,614 B1
(45) Date of Patent: Feb. 28, 2023

(54) INTELLIGENT REFRAMING

(71) Applicant: Amazon Technologies, Inc., Seattle, WA (US)

(72) Inventors: Hooman Mahyar, Seattle, WA (US); Arjun Cholkar, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/475,180

(22) Filed: Sep. 14, 2021

(51) Int. Cl.
*G06V 20/40* (2022.01)
*H04N 7/01* (2006.01)
*G06N 5/022* (2023.01)
*H04N 5/262* (2006.01)
*G06K 9/62* (2022.01)
*G10L 25/57* (2013.01)
*G06F 40/20* (2020.01)

(52) U.S. Cl.
CPC ........... *H04N 7/0122* (2013.01); *G06F 40/20* (2020.01); *G06K 9/623* (2013.01); *G06N 5/022* (2013.01); *G06V 20/41* (2022.01); *G06V 20/46* (2022.01); *G10L 25/57* (2013.01); *H04N 5/2628* (2013.01)

(58) Field of Classification Search
CPC .... H04N 7/0122; H04N 5/2628; G06K 9/623; G06V 20/46; G06V 20/41; G06N 5/022; G06F 40/20; G10L 25/57

USPC .................................................. 348/441, 445
See application file for complete search history.

(56) References Cited

U.S. PATENT DOCUMENTS

2010/0123782 A1* 5/2010 Yata ................. H04N 5/232945
348/169

* cited by examiner

*Primary Examiner* — Sherrie Hsia
(74) *Attorney, Agent, or Firm* — Kilpatrick Townsend & Stockton LLP

(57) ABSTRACT

Intelligent reframing techniques are described in which content (e.g., a movie) can be generated in a different aspect ratio than previously provided. These techniques include obtaining various video frames having a first aspect ratio. Various objects can be identified within the frames. An object having the highest degree of importance in a frame can be selected and a focal point can be calculated based at least in part on that object. A modified version of the content can be generated in a second aspect ratio that is different from the first aspect ratio. The modified version can be generated using the focal point calculated based on the object having the greatest degree of importance. Using these techniques, the content can be provided in a different aspect ratio while ensuring that the most important features of the frame still appear in the new version of the content.

20 Claims, 11 Drawing Sheets

INTELLIGENT REFRAMING

BACKGROUND

Due to the growing number of mobile devices and platforms with which video content can be viewed, aspect ratios such as 16:9 or 4:3 don't always provide the best viewing experience. Traditional approaches for reframing video content usually involve static cropping, where a middle point of the original frame is utilized and content falling outside the boundaries for that aspect ratio is discarded. This can causes important features of the frame (e.g., the main actor) from being cutoff or excluded entirely. These techniques often lead to unsatisfactory results due to the variety of composition and camera motion styles.

BRIEF DESCRIPTION OF THE DRAWINGS

Various embodiments in accordance with the present disclosure will be described with reference to the drawings, in which.

DETAILED DESCRIPTION

Figure 1:
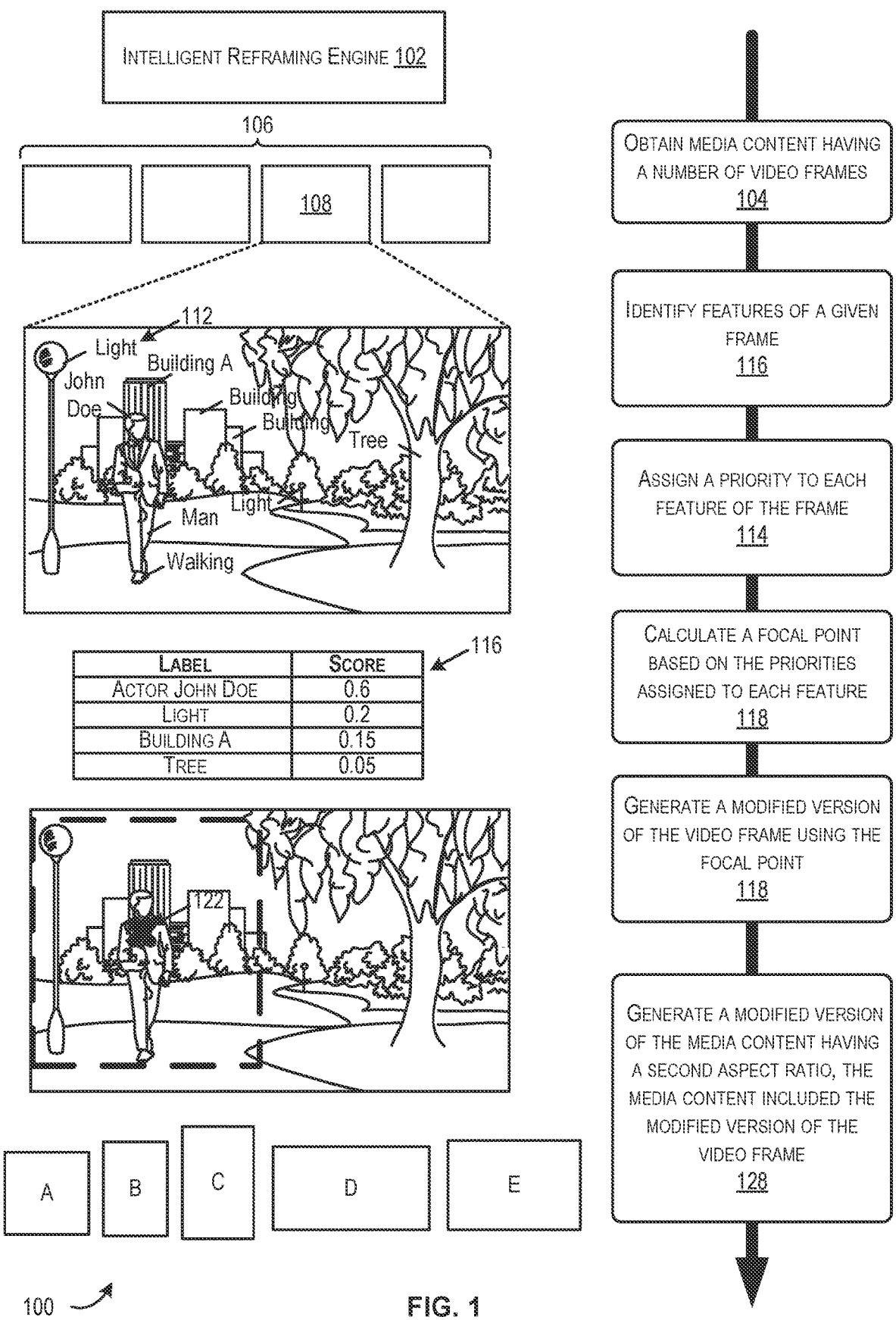
FIG. 1 is an example flow for implementing aspects of an intelligent reframing engine, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Some or all of the processed described herein, or variations, and/or combinations thereof, may be performed under the control of one or more computer systems and/or devices configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory.

Techniques described herein include identifying a focal point within a set of video frames of content (e.g., a movie, a television episode, a video clip, etc.) with which a modified version of the content can be generated. By way of example, the techniques described herein enable various visual features (also referred to herein as "visual attributes") of a video frame to be identified. In some embodiments, a number of machine-learning models may be trained and/or employed to identify various visual features such as objects, faces, and actions (e.g., running, exploding, driving, etc.). These features can be scored based at least in part on the size at which the feature is presented, a position within the video frame at which the feature is positioned, a frequency at which the feature is presented within the content (e.g., how many times the feature appears in frames of the content), the blurriness with which the feature is presented, the brightness of the feature, a degree to which the feature corresponds to textual data associated with the content (e.g., a synopsis of the movie, one or more movie reviews, etc.) and/or audio of the content. Using these scores, one or more visual features may be identified as being most important for the video frame. The operations described above can be performed any suitable number of times (e.g., such as for each video frame, or sets of consecutive frames, of the content).

Using these scores, a focal point for each frame may be calculated based on the positions of the most-important (e.g., a set of the highest scored) visual feature(s) of each frame. Subsequently, a number of modified versions of the content may be generated using the focal point identified for each frame. By way of example, the content may be generated in various aspect ratios (e.g., aspect ratios that are not the same as the aspect ratio in which the content was originally provided) such that the original content is cropped in accordance with the desired aspect ratio using the focal point for each frame. Subsequently, a request may be received for the content. The request may identify a particular aspect ratio, or the aspect ratio for the content to be provided may be determined based at least in part on matching dimensions of the requesting device's display to a particular aspect ratio in which the content is now provided.

By way of example, a user can navigate to a website that hosts an electronic catalog of digital items (e.g., movies, television shows, video clips, etc.) and select particular content such as a movie. The movie may be previously processed in the manner discussed herein such that every frame of the movie has had a corresponding focal point identified. Upon selecting the movie, a request may be received by a service provider computer hosting the website. The request may indicate the movie requested and device data (e.g., device type, serial number, display size, etc.) for the device from which the request was initiated. The system may then generate the movie in the aspect ratio corresponding to the display size and dimensions of the user's device using the previously identified focal points for each video frame. Using the corresponding focal point of each video frame ensures that the movie frames include the most important features of the frame.

These techniques provide a number of advantages. For example, content may be transformed into a variety of aspect ratios automatically, without requiring what would be a heavily time-intensive manual process for cropping each and every frame of the content. For example, manually identifying boundaries of every frame in a movie would likely take days for a human to complete. Utilizing the techniques disclosed herein, the process may be reduced to mere minutes. By analyzing the various aspects of the manner in which a feature is presented in a frame and various indications that the feature is important to the frame, the frame may be cropped to be provided in accordance with a particular aspect ratio while ensuring that the important features of the frame still appear in the cropped version.

Moving on to FIG. 1, which illustrates a flow 100 for implementing aspects of an intelligent reframing engine, in accordance with at least one embodiment. The flow 100 may be executed by the intelligent reframing engine 102.

The flow 100 may begin at 104, where media content (e.g., a movie) having a number of video frames (e.g., video frames 106 may be obtained). The video frames 106 may include video frame 108.

At 110, a number of features (e.g., visual features, audio features, textual features, etc.) may be identified for a given frame (e.g., the video frame 108). In some embodiments, one or more of these features (e.g., visual features such as one or more object(s), face(s), and/or action(s)) may be identified as being depicted in the video frame 108. These features (e.g., visual features) may be identified based at least in part on providing the video frame 108 to one or more machine-learning and/or deep-learning models (e.g., the model(s) 502 discussed below in connection with FIG. 5). In some embodiments, output of such model(s) may indicate one or more label(s) (e.g., label 112) identifying one or more objects, faces, and/or action depicted within the video frame 108. In some embodiments, an audio segment identified as corresponding to the video frame 108 may be provided to one or more of the model(s) 502 (e.g., the audio detection model). The model(s) may be configured to identify one or more labels corresponding to sounds identified within an audio segment and corresponding to the video frame 108 (e.g., an audio segment that includes the sounds of the film from 2 seconds before and after a run time associated with the video frame 108). In some embodiments, one or more text samples associated with the video frame 108 may be provided to the one or more model(s) (e.g., the NLP model described below with respect to FIG. 5). The text samples may include any suitable number of one or more of a synopsis, summary, and/or review of the movie. In some embodiments, labels corresponding to the keywords (e.g., nouns, verbs, etc.) identified from the text samples may be identified and associated with the image.

At 114, a priority may be assigned to each feature of the frame. By way of example, each label (e.g., a label identified as a visual, audio, or textual feature of the video image) may be scored according to metadata associated with the object, face, action, keyword, or sound corresponding to the label. In some embodiments, this score may be based at least in part on any suitable combination of a size, a location at which the visual feature associated with the label is depicted, a blurriness of the visual feature, a brightness of the visual feature, or any suitable visual attribute of the visual feature, a loudness corresponding to a sound associated with the audio segment corresponding to the video frame, a run time and/or index corresponding to a location with the audio segment within which the sound was identified, a prevalence value indicating a relative loudness of the sounds with respect to other sounds occurring at the same time, a loudness value indicating a degree of loudness of the sound, and/or a frequency corresponding to a number of times a visual feature corresponding to a label occurs within the movie (e.g., within the video frames 106).

The scores are depicted at 116. In some embodiments, every label is scored and a top n highest-scored labels may be identified. In some embodiments, the top n labels may be assigned a priority (e.g., a priority corresponding to 1-n) where each priority indicates an order to the degree of importance each feature corresponding to the label has within the video frame 108. The score for each label may be calculated based at least in part on any suitable metadata associated with each label. As a non-limiting example, the labels identified as corresponding to object(s), face(s), action (s) of the video frame 108 may be identified. The top four labels may be selected based at least in part on the scores. The number of labels selected may be predefined or configurable. In some embodiments, the scores may be recalculated and/or weighted such that the scores add up to 1. In some embodiments, the priority of the label may be assigned based at least in part on the score. In the example provided, the label corresponding to the actor, John Doe, may receive the highest priority, with the next priority being the light, with the next priority being building A, and with the final priority being the tree.

At 118, a focal point may be calculated for the video frame 108 based at least in part on the scores and/or the priorities assigned at 114. By way of example, a predefined formula can be utilized to calculate a focal point. In some embodiments, the focal point may initially be calculated as being equidistant to each of the visual features corresponding to the labels provided and skewed in a direction to each of the labels proportional to the labels priority. In some embodiments, the initial focal point may be set to the most important feature (e.g., John Doe) of the video frame 108 and skew based at least in part on the degree of importance toward the light, the building A and the tree, where the focal point is mostly skewed toward the light, less so toward the building A, and even less so toward the tree.

At 120, a modified version of the media content having a second aspect ratio may be generated where the media content generated includes the modified version of the video frame 108. As a non-limiting example, the images (e.g., video frames A-E) may be generated from the video frame 108 using different aspect ratios and the focal point 122. In some embodiments, the process discussed in connection with FIG. 1 may be performed any suitable number of times (e.g., for every video frame of the movie). A request may be later received for the content in a particular aspect ratio and the video frames generated for that aspect ratio using the techniques described in FIG. 1 may be utilized to stream or otherwise provide the content in the requested aspect ratio.

Figure 2:
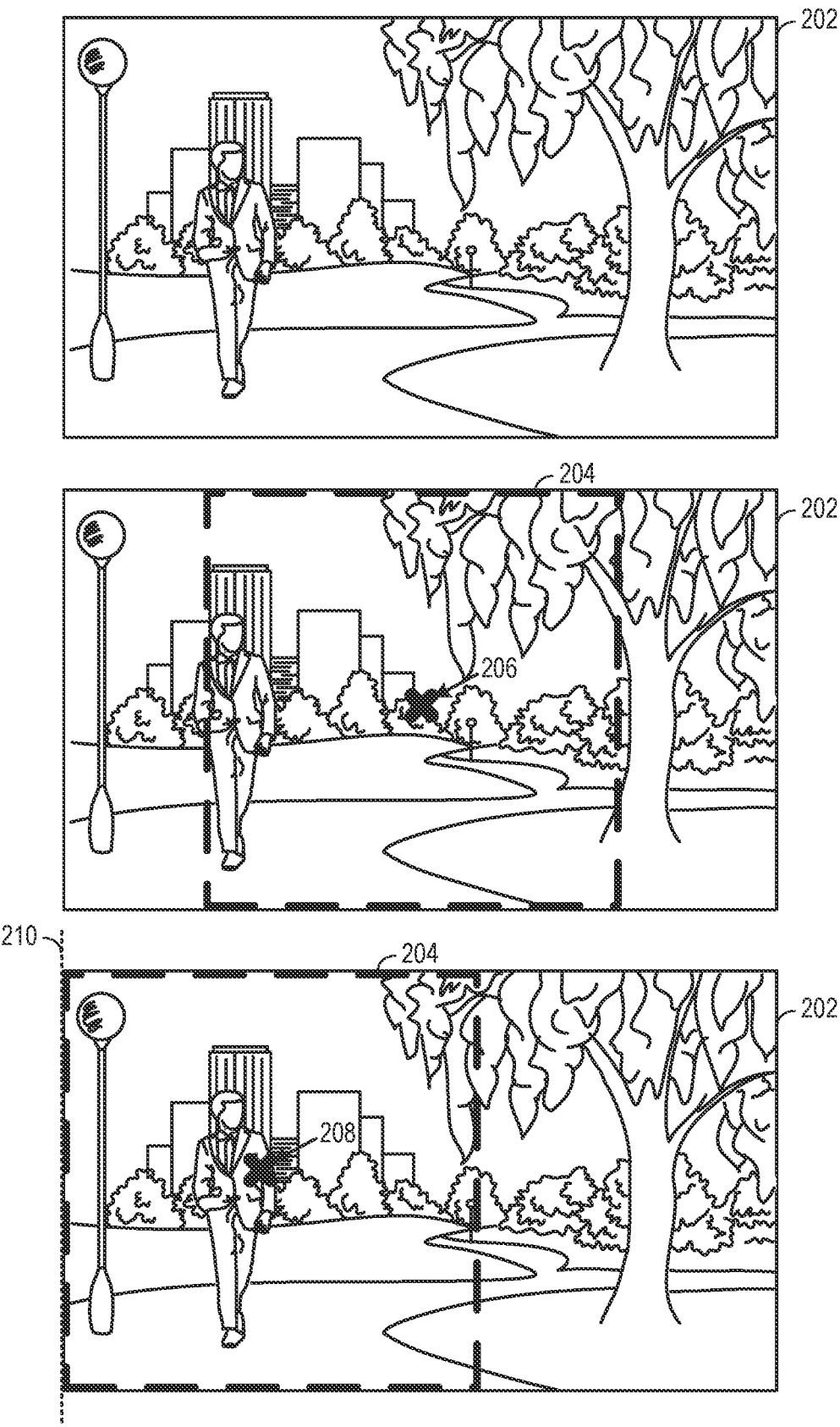
FIG. 2 depicts an example image in which a focal point can be identified, in accordance with at least one embodiment.

FIG. 2 depicts an example image 202 in which a focal point can be identified, in accordance with at least one embodiment. Image 202 may correspond to an original version of a video frame (e.g., video frame 108 of FIG. 1). Conventionally, a new version of the image 202 may be generated according to an aspect ratio 204. In some embodiments, a focal point 206 may be assessed as being in the middle of the frame, regardless of the content of the image 202. This might mean that important features of the image 202 (e.g., John Doe) may be cut off or left out entirely from the image when the image 202 is cropped in accordance with the aspect ratio 204. When cropped, any suitable portion of the image 202 occurring outside the aspect ratio boundaries may be removed (e.g., cropped) from the image 202.

Using the techniques disclosed herein enable focal point 208 to be calculate such that, when cropped, the image 202 includes visual features (e.g., John Doe, the light, and a building) identified as being over some degree of importance to the image 202. In some embodiments, if a focal point is determined to be within a threshold difference to a side of the original image, then a side boundary for the cropped image may be aligned to a side boundary of the original image (e.g., side boundary 210).

Figure 3:
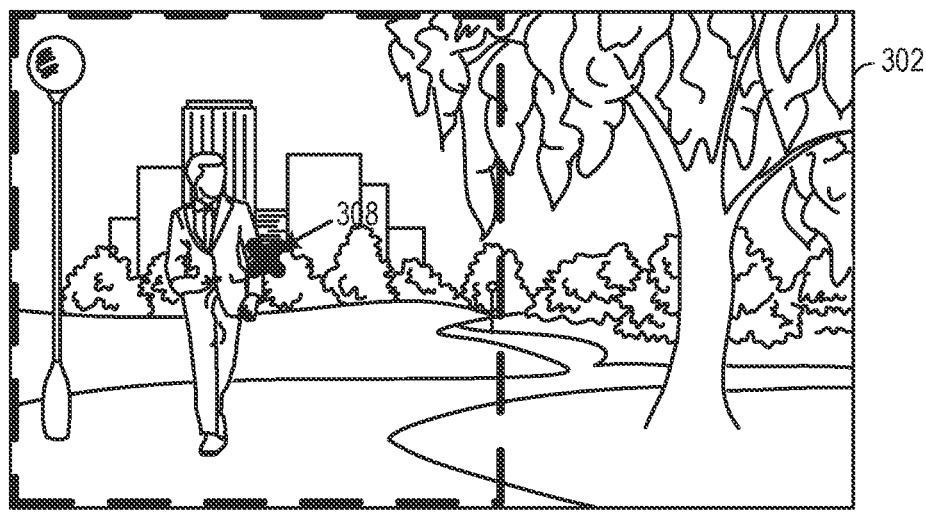
FIG. 3 depicts additional images in which respective focal points can be identified, in accordance with at least one embodiment.
Figure 3:
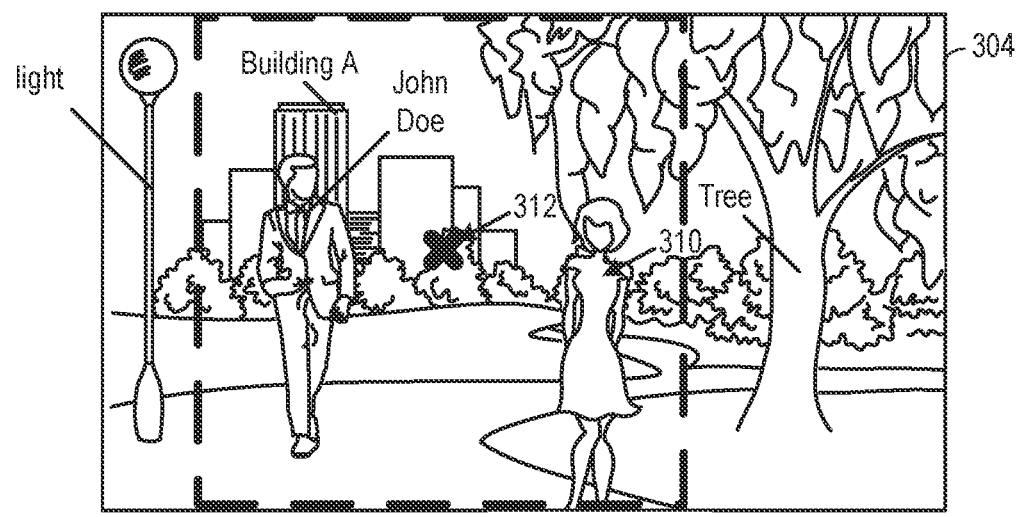
Figure 3:
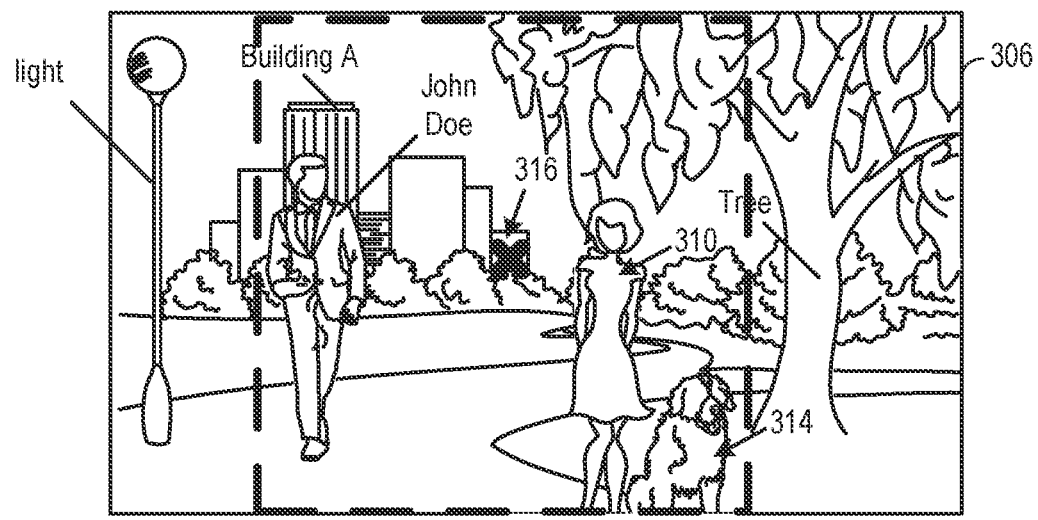

FIG. 3 depicts additional images (e.g., images 302-306) in which respective focal points can be identified, in accordance with at least one embodiment. By way of example, the image 302 may correspond to the image 202 of FIG. 2 and may have a focal point 308 corresponding to the focal point 208 of FIG. 2 identified for the image 302. The focal point 308 may be calculated based at least in part on the scores associated with the most important labels corresponding to the image 302 (e.g., John Doe, light, building A, and tree as provided in FIG. 1).

FIG. 304 may correspond to the image 202 but may now include an additional object, woman 310. The image 304 may be associated with focal point 312 based at least in part on the scores associated with the most important labels corresponding to the image 302 (e.g., in this example, John Doe, the woman, light, and building A).

FIG. 304 may correspond to the image 202 but may now include two additional objects, woman 310, and dog 314. The image 306 may be associated with focal point 316 based at least in part on the scores associated with the most important labels corresponding to the image 302 (e.g., in this example, John Doe, the woman, the dog, and the light).

Figure 4:
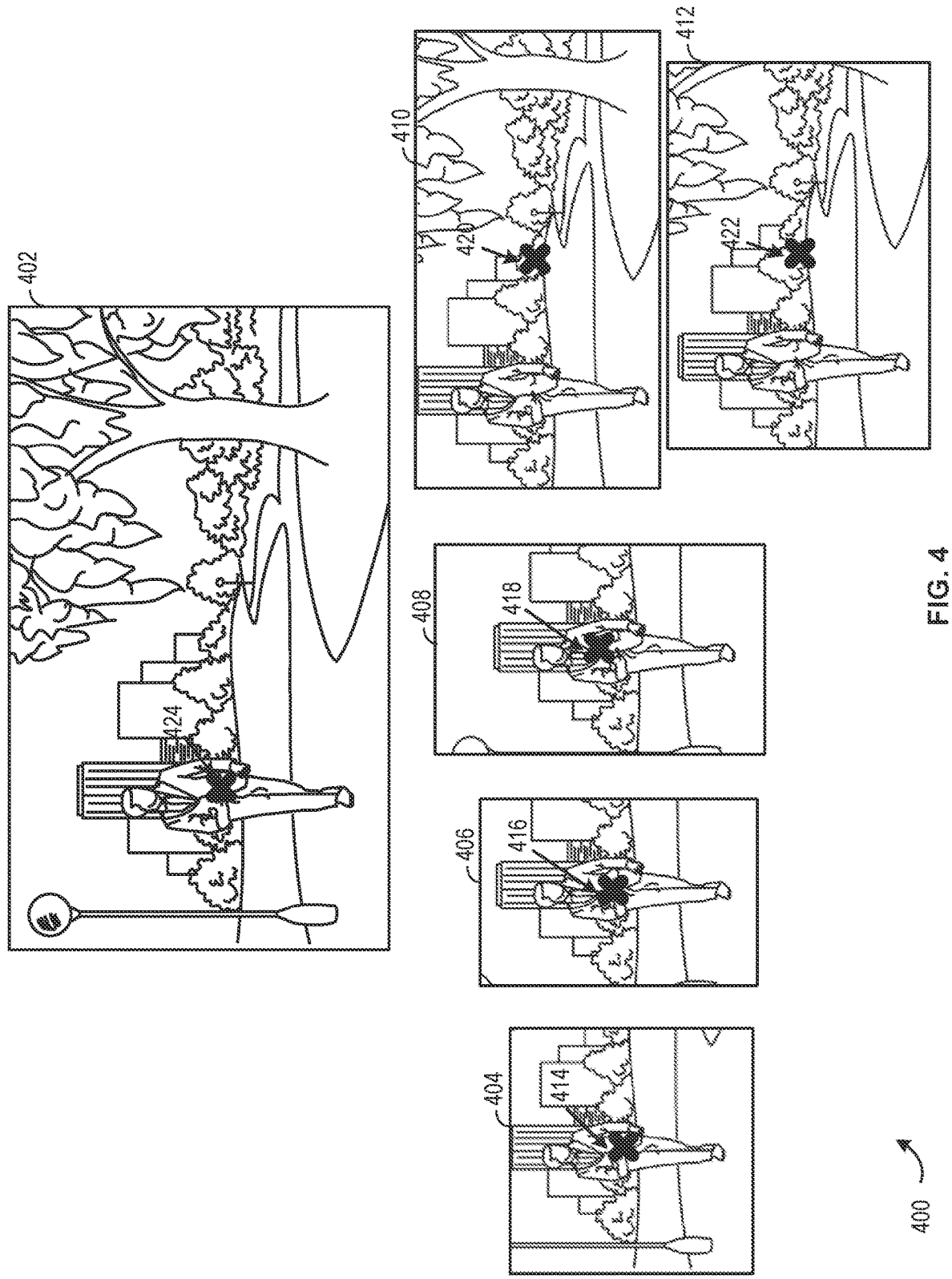
FIG. 4 is a schematic diagram illustrating a number of different aspect ratios that can be generated from an image, in accordance with at least one embodiment.

FIG. 4 is a schematic diagram illustrating a number of different aspect ratios that can be generated from an image, in accordance with at least one embodiment. By way of example, video frame 402 may correspond with an original aspect ratio of video frame 402 (e.g., corresponding to the video frame 108, image 202, and image 302, of FIGS. 1-3, respectively). Video frames 404-412 may individually correspond to the video frame 402 as provided in different aspect ratios. It may be appreciated that the focal point for the video frame 402 may be adjusted based at least in part on the aspect ratio of the image to be generated. Thus, focal points 414-422 may be adjusted from focal point 424 corresponding to focal point 208 of FIG. 2) based at least in part on the particular dimensions of the aspect ratio for which the new video frame is to be generated.

In some embodiments, the number of aspect ratios utilized may include any suitable number of aspect ratios such as, but not limited to square (e.g., 1:1, corresponding to video frame 404, as depicted), vertical (e.g., 5:4, corresponding to video frame 406, as depicted), portrait (e.g., 9:16, corresponding to video frame 408, as depicted), cinema (2.35:1, corresponding to video frame 410, as depicted), and landscape/HDTV (e.g., 16:9, corresponding to video frame 412, as depicted).

Figure 5:
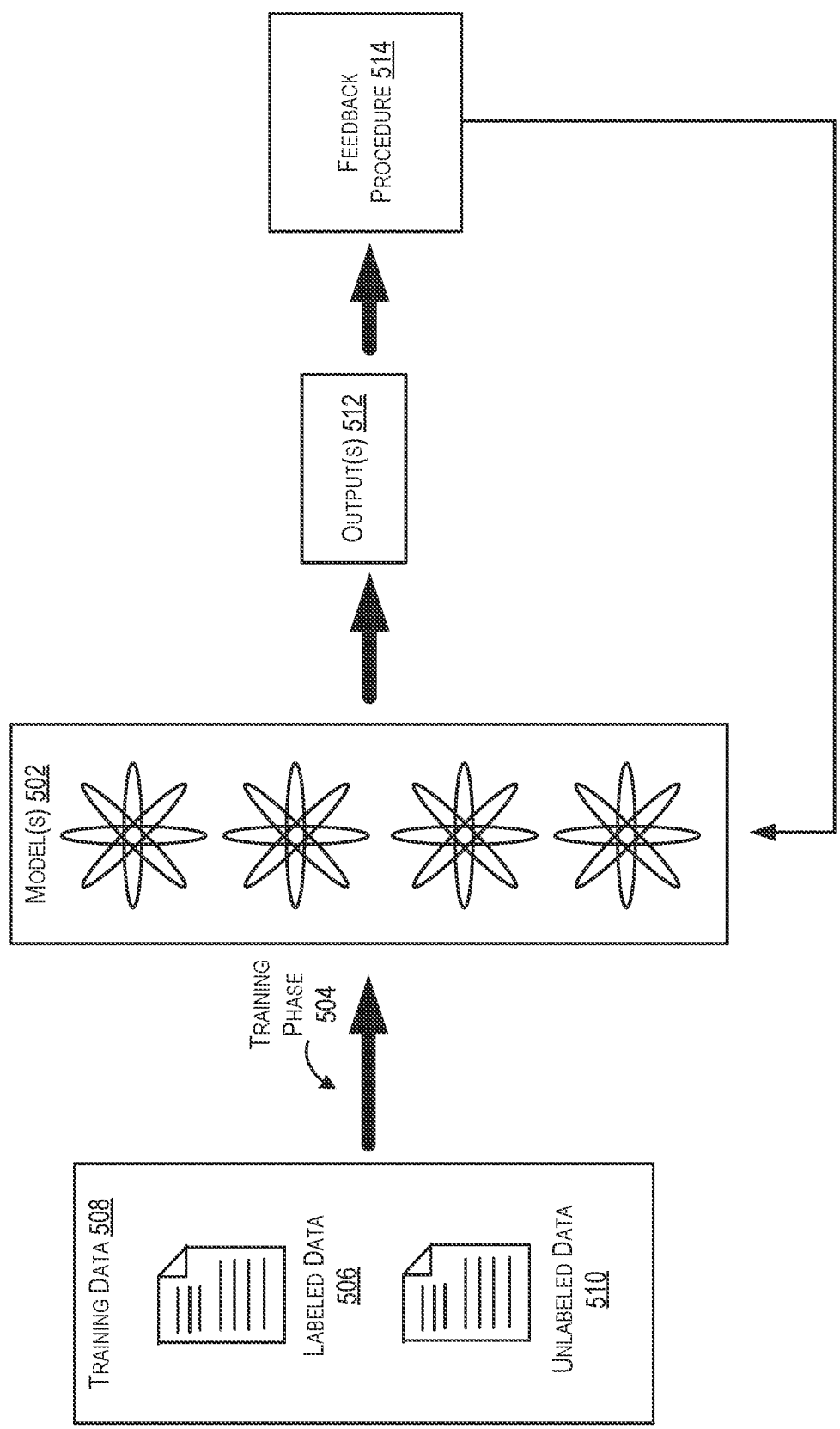
FIG. 5 illustrates a flow for an example process for training a number of machine-learning models to identify features of an image, in accordance with at least one embodiment.

FIG. 5 illustrates a flow for an example method 500 for training a number of machine-learning models (e.g., model(s) 502) to identify features of an image, in accordance with at least one embodiment. The method 500 may be performed by the intelligent reframing engine 102 of FIG. 1 and/or, at least partially, by a computing component separate and distinct from the intelligent reframing engine 102.

The model(s) 502 may be trained using any suitable machine-learning algorithms (e.g., supervised, unsupervised, semi-supervised, reinforced, etc.) and any suitable number of training data sets. A supervised machine-learning algorithm refers to a machine learning task that includes learning an inferred function that maps an input to an output based on a labeled training data set for which example input/output pairs are known. Unsupervised machine-learning algorithms refer to a set of algorithms that are used to analyze and cluster unlabeled data sets. These algorithms are configured to identify patterns or data groupings without the need for human intervention. Semi-supervised machine-learning algorithms refer to a set of algorithms that are a mix of supervised and unsupervised machine-learning algorithms. In semi-supervised learning, an algorithms learns from a dataset that includes both labeled and unlabeled data. Reinforced machine-learning algorithms refer to a set of algorithms in which the model receives a delayed reward in the next time step to evaluate its previous action. The concept in reinforced learning is to determine what actions should be taken to maximize the reward for the given circumstances. In some embodiments, any suitable number of model(s) 502 may be trained (e.g., during training phase 504) using any suitable machine-learning algorithms and/or deep-learning techniques. Thus, one or more of the model(s) 502 may be a convolutional neural network (CNN).

The model(s) 502 may include any suitable number of models. One or more of model(s) 502 may include an object detection model. As used herein, an "object detection model" is intended to refer to a model (e.g., an inferred function, a clustering algorithm, a machine-learning algorithm, a neural network, etc.) that is configured to identify one or more objects in an image provided as input. In some embodiments, the model may further identify the position of the one or more object in the image provided as input. A "label" as used within the various examples provided herein, is intended to refer to any suitable alphanumeric identifier that uniquely identifies a visual, audible, and/or textual feature.

As a non-limiting example, at least one of the model(s) 502 can be trained during training phase 504 using a supervised learning algorithm and labeled data 506 to identify various objects from an image provided as input. Labeled data 506 may be any suitable portion of potential training data (e.g., training data 508) that can be used to train various models to identify objects (e.g., trees, buildings, dogs, cats, balls, food, etc.) depicted in an input image (e.g., a video frame provided as input). Labeled data 506 may include any suitable number of examples of images (e.g., individual video frames), where each image is associated with a set of labels identifying respective objects that are depicted within the image. In some embodiments, labeled data 506 may include positions within the image at which the object corresponding to a label is presented. Using the labeled data 506, a model (e.g., an inferred function) may be learned that maps an input (e.g., an image) to an output (e.g., one or more labels corresponding to objects identified within the image).

In some embodiments, at least one of the model(s) 502 include a facial detection model. As used herein, a "facial detection model" is intended to refer to a model (e.g., an inferred function, a clustering algorithm, a machine-learning algorithm, a neural network, etc.) that is configured to identify one or more faces in an image provided as input. In some embodiments, a facial detection model may be configured to identify particular faces (e.g., faces of actors, politicians, etc.). A facial detection model may be trained to identify faces within an input image (e.g., input data) based on inferring a function during the training phase 504 using a labeled training data set (e.g., labeled data 506) that includes a set of input images and labels indicating whether the corresponding image included a face or not. If the model is to be trained to identify particular faces, the labeled data 506 can include labels that identify the identity of the particular face(s) (e.g., George Clooney, Tom Hanks, Meg Ryan, etc.) in the corresponding image. In some embodiments, the label can be assigned an alphanumeric identifier such that it can be identified as relating to other faces identified from other images.

In some embodiments, at least one of the model(s) 502 include an action detection model. As used herein, an "action detection model" is intended to refer to a model (e.g., an inferred function, a clustering algorithm, a machine-learning algorithm, a neural network, etc.) that is configured to identify one or more actions depicted in a set of images (e.g., 10 frames, 50 frames, etc.) provided as input. In some embodiments, an action detection model may be trained to identify actions depicted within a set of input images (e.g., two or more consecutive video frames) based on inferring a function using a labeled training data set (e.g., labeled data 506) that includes sets of input images (e.g., sets of two or more consecutive video frames) and labels indicating whether the corresponding set depicts a particular action (e.g., running, swimming, exploding, etc.).

It should be appreciated that, in addition to identifying the visual features (e.g., objects, faces, and actions) described above, each model may be configured to identify additional metadata such as the corresponding size, location, blurriness, brightness, and/or any suitable visual attribute of the visual feature identified.

In some embodiments, at least one of the model(s) 502 can include an audio processing model. As used herein, an "audio processing model" is intended to refer to a model (e.g., an inferred function, a clustering algorithm, a machine-learning algorithm, a neural network, etc.) that is configured to identify one or more sounds occurring within a segment of audio (e.g., a five second segment of audio corresponding to a number of video frames of a movie). In some embodiments, an audio detection model may be trained to identify particular sounds (e.g., gun fire, a tiger's roar, bird song, dogs barking, dialog, etc.) within the input audio segment. In some embodiments, the audio detection model is trained based on inferring a function using a labeled training data set (e.g., labeled data 506) that includes an audio segment and labels indicating whether the particular sounds (corresponding to any suitable entity such as an animal, person, object, or the like) occur within the segment. In some embodiments, the labeled training data set (and, in some cases, the output of the audio processing model) may include indices indicating one or more locations within the audio segment at which the sound occurs. The indices can be time-based indicating, for example, that a particular sound occurred 2.1 seconds into the audio segment and again at 2.5 seconds of the audio segment. In some embodiments, the indices may be associated with corresponding durations indicating how long the particular sound continued. These durations may also be provided as output of the audio processing model. In some embodiments, the loudness or prevalence (e.g., the relative degree of loudness as compared to other sounds occurring at the same time) of the sound may be determined and provided as output. In some embodiments, this output may be provided as a value indicating a degree of loudness, or a value indicating the prevalence (e.g., "1" indicating the sound was the most prevalence sound at the time, 65% indicating that the sound made up 65% of all sounds made at the time, etc.).

The model(s) 502 may include any suitable number of models that are trained with natural language processing techniques to identify one or more keywords from text provided as input. By way of example, one such model (referred to as a "NLP model") may be trained to identify nouns, verbs, and the like from input text such as a synopsis of a movie. In some embodiments, labeled data 506 may include text samples that are tagged or otherwise annotated with keywords identified for each text document. Using supervised learning techniques, a keyword detection model may be trained to identify one or more keywords from subsequent text provided as input using the labeled data 506.

The model(s) 502, and the various type of those models discussed above, may include any suitable number of models that are trained using unsupervised learning techniques to identify objects, faces, actions, and/or sounds. Unsupervised machine-learning algorithms are configured to learn patterns from untagged data. In some embodiments, the training phase 504 may utilize unsupervised machine-learning algorithms to generate one or more models. For example, the training data 508 may include unlabeled data 510. Unlabeled data 510 may be utilized, together with an unsupervised learning algorithm to segment the entries of unlabeled data 510 into groups. The unsupervised learning algorithm may be configured to cause similar entries to be grouped together in a common group. An example of an unsupervised learning algorithm may include clustering methods such as k-means clustering, DBScan, and the like. In some embodiments, the unlabeled data 510 may be clustered with the labeled data 506 such that unlabeled instances of a given group may be assigned the same labeled as other labeled instances within the group.

The model(s) 502, and the various type of those models discussed above, may include any suitable number of models that are trained using deep learning techniques to identify objects, faces, actions, sounds, and/or keywords. In some embodiments, a convolutional neural network (CNN) can be used to automatically learn an object's/faces inherent features in order to identify that object. The CNN may utilize any suitable number of convolutional layers to extract high or low level features such as edges, color, gradient orientation, and the like. A CNN extracts such features, flattens them (e.g., converts the features into a vector of features), and provides the features (e.g., the feature vector) to a neural network for classification purposes. Over time, the CNN is able to distinguish between objects/faces and classify them.

In some embodiments, any suitable portion of the training data 508 may be utilized during the training phase 504 to train the model(s) 502. For example, 70% of labeled data 506 and/or unlabeled data 510 may be utilized to train the model(s) 502. Once trained, or at any suitable time, the model(s) 502 may be evaluated to assess their quality (e.g., accuracy). By way of example, a portion of the examples of labeled data 506 and/or unlabeled data 510 may be utilized as input to the model(s) 502 in order to generate output(s) 512. By way of an example, an example of the labeled data 506 may be provided as input, and the corresponding output (e.g., output(s) 512) may be compared to the label already known to be associated with the example. If some portion of the output (e.g., a label) matches the example label, that portion of the output may be deemed accurate. Any suitable number of labeled examples may be utilized and a number of accurate labels may be compared to the total number of examples provided (and/or the total number of labels previously-identified) to determine an accuracy value for a given model that quantifies a degree of accuracy for the model. For example, if 90 out of 100 of the input examples generate output labels that match the previously known example labels, the model being assessed may be determined to be 90% accurate.

In some embodiments, as the model(s) 502 are utilized for subsequent inputs, the subsequent output generated by the model(s) 502 may be added to corresponding input and used to retrain and/or update the model(s) 502. In some embodiments, the example may not be used to retrain or update the model until feedback procedure 514 is executed. In feedback procedure 514 the example (e.g., an image, an audio segment, a text sample, etc.) and the corresponding output generated for the example by one of the model(s) 502 is presented to a user and the user identifies whether the label (e.g., a label identifying an object, face, action, sound, keyword, etc.) is correct for the given example.

The training process depicted in FIG. 5 (e.g., method 500) may be performed any suitable number of times at any suitable interval and/or according to any suitable schedule such that the accuracy of the model(s) 502 are improved over time.

Figure 6:
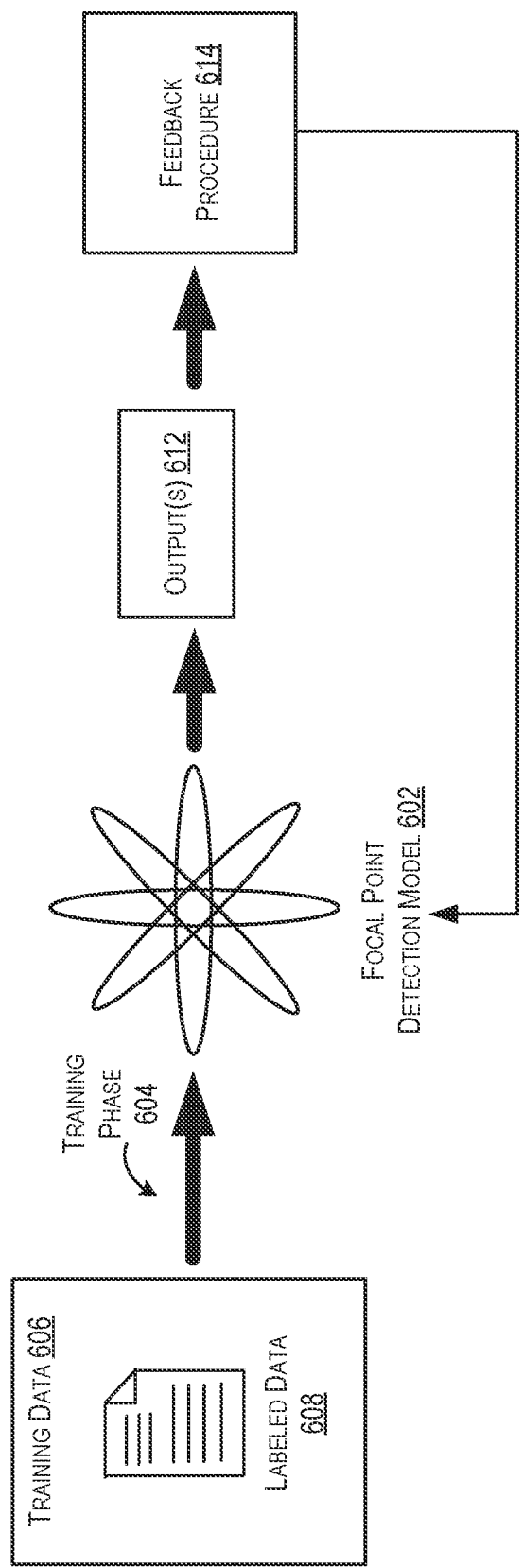
FIG. 6 illustrates a flow for an example process for training a focal point detection model, in accordance with at least one embodiment.

FIG. 6 illustrates a flow for an example method 600 for training a focal point detection model, in accordance with at least one embodiment. The method 600 may be performed by the intelligent reframing engine 102 of FIG. 1 and/or, at least partially, by a computing component separate and distinct from the intelligent reframing engine 102.

In some embodiments, the focal point detection model 602 may be trained during a training phase 604 with training data 606 and any suitable machine-learning or deep-learning techniques described above in connection with FIG. 5. Training data 606 may include labeled data 608 and may include any suitable data for identifying a focal point in an input image. By way of example, the labeled data 608 may include any suitable combination of the outputs of model(s) 502 of FIG. 5. That is, each example of labeled data 608 may include a subject image and any suitable number and combination of objects, faces, and actions (and potentially the corresponding locations of each) identified within the subject image. In some embodiments, the example may include a corresponding audio segment and the one or more sounds/entities identified within the audio segment as well as the location and duration corresponding to the same. In some embodiments, the example may include a text sample (e.g., a synopsis or summary of the content of which the image and audio segment is a part) and/or the keywords (e.g., nouns, verbs, etc.) identified from the same. In some embodiments, each sample may include metadata such as a size, location, blurriness, brightness, or the like of each object, face, or action identified within the image. In some embodiments, a frequency associated with a number of times each object, face, or action occurs within the content as a whole may be included in each sample. In some embodiments, a score indicating an importance of the object, face, or action may be included in each sample. A description of the manner in which such a score may be calculated will be discussed in more detail with respect to FIG. 7. Each example of the labeled data 608 may be annotated with a location corresponding to a focal point identified for the image.

The objects, faces, actions, and any suitable metadata (e.g., size, blurriness, location, color, brightness, etc.) associated with the same may be collectively referred to as the "features" or "visual features" of the image, while any suitable data (e.g., the index and/or duration) of the sound(s) of the audio segment may be collectively referred to as the "features" or "audio features" associated with the audio segment as well as the image (e.g., a corresponding video frame).

In some embodiments, the focal point detection model 602 may be trained using the training data 606 and any suitable machine-learning or deep-learning algorithms discussed herein to identify, from an image provided as input, a focal point of the image. The focal point of the image may be determined by the focal point detection model 602 as a point which may suit as a center of the image as cropped in accordance with any suitable aspect ratio (e.g., an aspect ratio of a predefined number of aspect ratios) that would cause one or more entities (e.g., object, faces, actions) to mostly, if not entirely, to appear within the cropped image.

As described above, any suitable portion of the training data 606 may be utilized to train the focal point detection model 602 to identify output(s) 612 which may include a focal point that has been identified for each example input data (e.g., any suitable combination of an image and associated visual features and audio segment and associated audio features). In some embodiments, output(s) 612 may be compared to the known focal point of each example such that an accuracy of the focal point detection model 602 may be ascertained. In some embodiments, if the focal point identified by the focal point detection model 602 is within a predefined threshold distance from the focal point identified in the training data 606 for a given example, the focal point identified by the focal point detection model 602 may be considered to be accurate. In some embodiments, the focal point detection model 602 may be trained but not utilized until the accuracy identified for the model breached a predefined threshold (e.g., 80% accurate, 90% accurate, etc.).

In some embodiments, as the focal point detection model 602 is utilized for subsequent inputs, the subsequent output generated by the model may be added to corresponding input and used to retrain and/or update the focal point detection model 602. In some embodiments, the example may not be used to retrain or update the model until feedback procedure 614 is executed. In feedback procedure 614 the example (e.g., an image, an audio segment, a text sample, etc.) and the corresponding output generated for the example by the focal point detection model 602 is presented to a user and the user identifies whether the focal point is correct for the given example. For example, any suitable number of new images generated using the identified focal point and a different aspect ratio may be generated and presented to the user. By way of example, each of the aspect ratios discussed above in connection with FIG. 4 may be used with the focal point to generate images that correspond to the input image as cropped in accordance with each of the aspect ratios may be presented to the user. The user may then identify the focal point as being accurate or not. In some embodiments, feedback procedure 614 may further involve presenting the input image before cropping such that the user can ascertain if certain objects, faces, and/or actions were absent from any of the newly generated images. If so, the user can indicate that the focal point was inaccurate.

The input provided during the feedback procedure 614, either indicating the focal point provided as output was accurate or inaccurate, can be added to the training data 606 and/or used to retrain and/or update the focal point detection model 602 at any suitable time.

Figure 7:
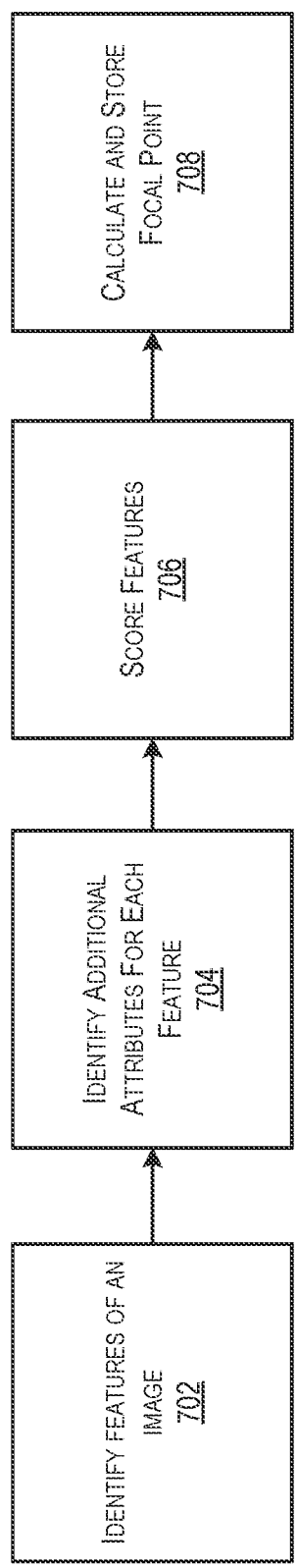
FIG. 7 is a flowchart illustrating an example method for calculating a focal point, in accordance with at least one embodiment.

FIG. 7 is a flowchart illustrating an example method 700 for calculating a focal point, in accordance with at least one embodiment. The method 700 may be performed by the intelligent reframing engine 102 of FIG. 1 and/or, at least partially, by a computing component separate and distinct from the intelligent reframing engine 102.

The flow 700 may begin at 702, where features of an image may be identified. By way of example, the image in question may be a video frame of a lengthier piece of content such as a movie or television episode. In some embodiments, the features identified may include any suitable combination of the attributes/features discussed above.

By way of example, the image may be provided separately to any suitable number of models (e.g., the model(s) 502) of FIG. 5 to identify any suitable number of objects, faces, and/or actions. In some embodiments, the image may be combined with one or more other images (e.g., consecutive video frames of the movie or television episode that collectively make up a span of time such as 5 seconds, 2 seconds, of video) as input to at least one of the models to identify whether the image depicts a portion of an action.

In some embodiments, an audio segment corresponding to the image (e.g., an audio segment that is associated with two or more consecutive video frames that include the image) may be provided to an audio processing model such as the one discussed above in connection with FIG. 5. In some embodiments, the audio processing model may identify as output any suitable number of objects (e.g., people, animals, objects) that are featured in the audio segment. In some embodiments, the output may identify the time which the corresponding sound occurred, the loudness or prevalence (e.g., the relative loudness as compared to other sounds occurring at the same time) of the sound, and/or the duration of the sound within the audio segment.

In some embodiments, one or more text samples (e.g., a synopsis, a review, a summary, or the like, or any suitable combination of the above) associated with the content may be used (individually and/or collectively) as input to the NLP model discussed above in connection with FIG. 5 in order to identify keywords of the text sample(s). In some embodiments, the text sample(s) may individually be parsed using any suitable parsing techniques to identify a parse tree for each text sample. The parse tree may be used to identify nouns and/or verbs or any suitable keyword or syntax of the text sample. These words may be stored as being associated with the content and/or every image of the content including the image in question.

At 704, additional attributes may be identified for each feature. By way of example, if a size, location, blurriness, brightness, or the any suitable visual feature was not provided by the output of the models used at 702, these attributes may be ascertained from the image for each object, face, and/or action identified at 702. In some embodiments, a frequency corresponding to each object, face, and/or action may be calculated. This may include analyzing every image of the content and its corresponding visual features to identify a number of times a particular object, face, and/or action appears in the content. By way of example, a face appearing in the image may correspond to a main character of a movie. The visual features (e.g., the faces) identified for every video frame of the content may be counted to identify that that face appears in some number of video frames of the content (e.g., 600 out of 1000, 75% of the video frames, etc.).

At 706, the visual features of the image may be scored. By way of example, the intelligent reframing engine 102 of FIG. 1 may be configured to score the features based at least in part on the particular objects, faces, and/or actions according to the metadata and/or the keywords and/or audio features that were identified for the image (or the content).

As a non-limiting example, an object, face, or action may receive a higher score when the label of an object, face, or action matches a keyword identified from one or more text samples associated with the content and/or an audio feature identified from a corresponding audio segment. For example, if a synopsis of a documentary film included the keyword "birds," and the image (e.g., a video frame of the film) included an image of a bird (e.g., an object), the object would receive a higher score than objects that did not match to a keyword identified from the text sample(s). Similarly, if the audio feature identified a tiger (or rather the sound of a tiger) and the image included a tiger, the score associated with the tiger object would receive a higher score based at least in part on identifying that two signals (e.g., a video feature and an audio feature) identified a tiger.

In some embodiments, the scoring may utilize a predefined word map. In some embodiments, the predefined word map may include nodes corresponding to words or phrases and edges that represent a relationship and/or meaning between the word(s) and/or phrase(s) connected by the edge. The predefined word map may also be referred to by one skilled in the art as a "semantic map," a "thinking map," a "bubble map," a "concept map," or the like.

In some embodiments, the labels corresponding to the objects, faces, actions, sounds, and/or keywords, or any suitable combination of the above, may be evaluated using the word map. If the labels corresponding to the objects, faces, and/or actions, relate to one another by traversing the word map, the object, face, action, sound, or keyword may receive a higher score than would otherwise be accessed if the labels corresponding to the object, face, action, sound, or keyword did not relate to one another. In some embodiments, the score may be calculated according to a degree of relatedness such that more heavily related terms (e.g., a label that closely relates to another label) may be scored higher than two terms that loosely relate. In some embodiments, the degree of relatedness may be calculated based at least in part on a predefined relatedness algorithm. This algorithm may take a set of labels as input and calculates a degree of relatedness between a label and one or more other labels based at least in part on a predefined algorithm that may include assessing the degree of relatedness based on a degree of similarity of the labels and/or a degree of relatedness determined based at least in part on traversing a predefined word map. In some embodiments, a number of predefined word maps may be stored and one or more of these word maps may be selected based on matching a subject corresponding to the word map (e.g., movies) to one or more labels of the objects, faces (e.g., a particular actor), actions, sounds, or keywords identified as being associated with the image.

In some embodiments, each label corresponding to an object, face, and/or action may be scored based at least in part on the metadata identified for each object, face, and/or action. By way of example, a label for each object identified within the image may be scored based at least in part on any suitable combination of a size, a location, a blurriness, a brightness, or any suitable other visual attributes of the object. The score for larger objects may be higher than the scores for smaller objects. In some embodiments, objects that appear closer to a center of the image may receive a higher score than those positioned closer to the edge (or further away from the center) of the image. In some embodiments, the blurrier the object, the lower the score it will receive, the brighter the object the higher the score it will receive. In some embodiments, a predefined weighted algorithm may be utilized to factor in some combination of the attributes discussed above in connection with the metadata. Each score for the object, face, and/or action may indicate a popularity and/or importance of the corresponding object, face, and/or action to the content and/or image (e.g., video frame). The score may therefore indicate how important the object, face, and/or action is and/or an inferred priority of displaying the objects, faces, and/or actions.

At 708, a focal point may be calculated and stored for subsequent use. By way of example, the intelligent reframing engine 102 may utilize a weighted algorithm that generates a focal point occurring at or within an area corresponding to one or more objects, faces, and/or actions depicted in the image. By way of example, a focal point can be calculated to occur as close to equidistant from three faces identified in the image. In some embodiments, the scores identified at 706 may cause the weight/priority of a given object/face/action to skew the focal point nearer to the object/face/action. That is, given two people identified in the subject image, the focal point may be calculated as being between the two people, but skewed nearer toward one of the people when the score associated with that person in the video frame is greater than the score associated with the other person.

Any suitable scoring algorithm may be utilized to identify the scores, and therefore, the priorities associated with the objects, faces, and actions identified within the image.

Figure 8:
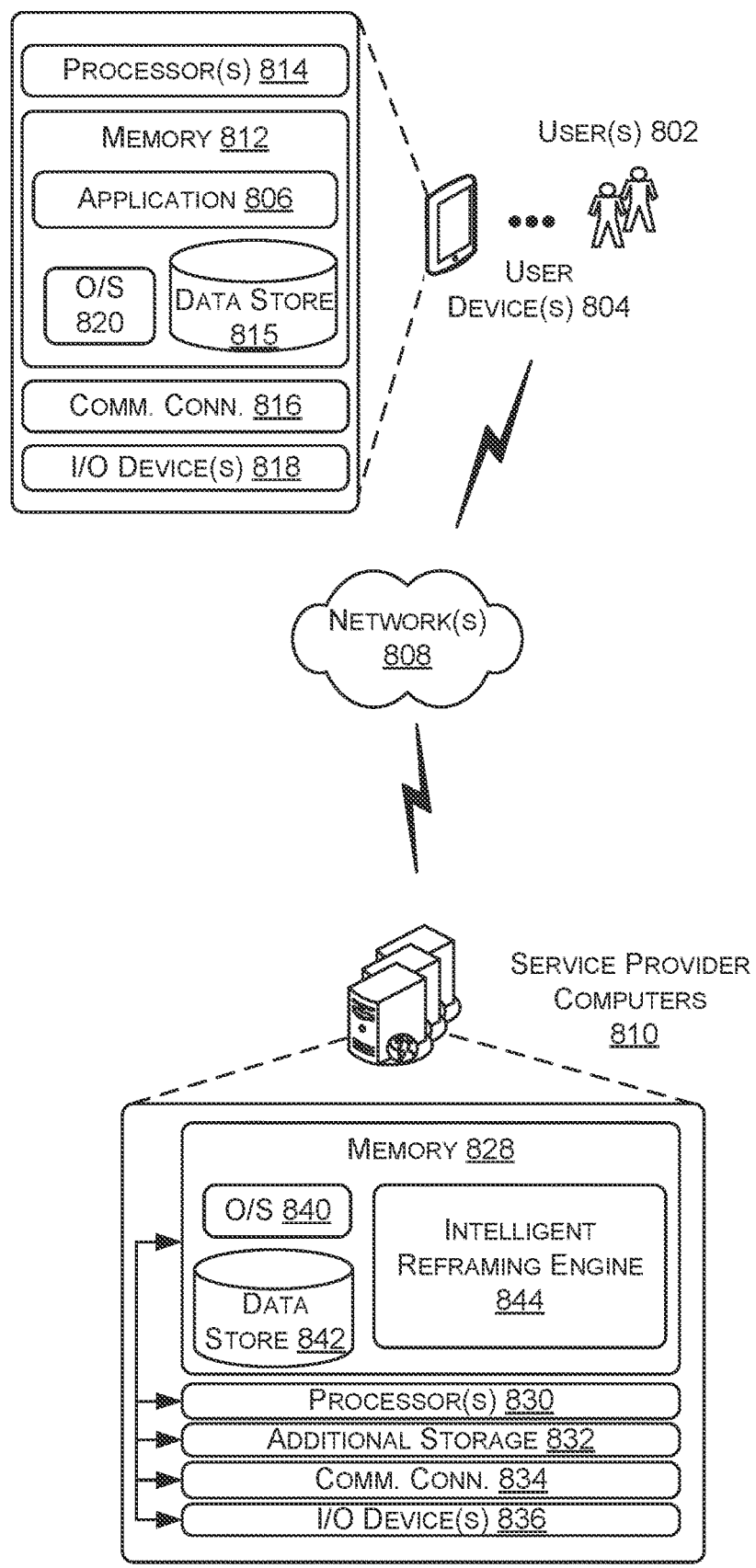
FIG. 8 illustrates components of an intelligent reframing system according to a particular embodiment.

FIG. 8 illustrates components of an intelligent reframing system 800 according to a particular embodiment. In system 800, one or more users 802 may utilize a user device (e.g., a user device of a collection of user devices 804 to navigate to a network page provided by the service provider computers 810. For example, the user may access a user interface accessible through an application 806 running on the user devices 804 via one or more networks 808. In some aspects, the application 806 operating on the user devices 804 may be hosted, managed, and/or provided by a computing resources service or service provider, such as by utilizing one or more service provider computers 810.

In some examples, the networks 808 may include any one or a combination of many different types of networks, such as cable networks, the Internet, wireless networks, cellular networks, and other private and/or public networks. While the illustrated example represents the users 802 accessing application functionality over the networks 808, the described techniques may equally apply in instances where the users 802 interact with the service provider computers 810 via the one or more user devices 804 over a landline phone, via a kiosk, or in any other suitable manner. It should be appreciated that the described techniques may apply in other client/server arrangements, as well as in non-client/server arrangements (e.g., locally stored applications, etc.).

As described briefly above, the application 806 may allow the users 802 to interact with the service provider computers 810 so as to provide the various functionality described above. For example, a user may utilize the application 806 to browse for various media content within an electronic catalog. In at least one example, the application 806 may provide a network page at which the users 802 may view an item (e.g., a movie, a television series/episode, etc.) and information associated with the item (e.g., trailers, cast information, images, descriptive text, etc.). The users 802 may utilize any suitable interface element of the network page provided by application 806 to conduct a transaction for procuring the item (e.g., purchasing, renting, etc.).

The service provider computers 810, perhaps arranged in a cluster of servers or as a server farm, may host the application 806 operating on the user devices 804 and/or cloud-based software services. Other server architectures may also be used to host the application 806 and/or cloud-based software services. The application 806 operating on the user devices 804 may be capable of handling requests from the users 802 and serving, in response, various user interfaces that can be rendered at the user devices 804. The application 806 operating on the user devices 804 can present any suitable type of website that supports user interaction, including search engine sites, item detail pages, and the like. The described techniques can similarly be implemented outside of the application 806, such as with other applications running on the user devices 804.

In some embodiments, the service provider computers 810 may be configured to operate as a streaming service. Thus, in some embodiments, the service provider computers 810 may stream various content to the user devices 804 via the application 806 and/or various other applications executing at the user devices 804. The application 806 (or another application executing at the user devices 804) may be configured to request content and present, at a display of the user devices 804, content streamed from the service provider computers 810.

The user devices 804 may be any suitable type of computing device such as, but not limited to, a mobile phone, a hand-held scanner, a touch screen device, a smartphone, a personal digital assistant (PDA), a laptop computer, a desktop computer, a thin-client device, a tablet PC, an electronic book (e-book) reader, etc. In some examples, the user devices 804 may be in communication with the service provider computers 810 via the networks 808, or via other network connections.

In one illustrative configuration, the user devices 804 may include at least one memory 812 and one or more processing units (or processor(s)) 814. The processor(s) 814 may be implemented as appropriate in hardware, computer-executable instructions, firmware, or combinations thereof. Computer-executable instruction or firmware implementations of the processor(s) 814 may include computer-executable or machine-executable instructions written in any suitable programming language to perform the various functions described.

The memory 812 may store program instructions that are loadable and executable on the processor(s) 814, as well as data generated during the execution of these programs. Depending on the configuration and type of user computing device, the memory 812 may be volatile (such as random access memory (RAM)) and/or non-volatile (such as read-only memory (ROM), flash memory, etc.). The user devices 804 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 812 may include multiple different types of memory, such as static random access memory (SRAM), dynamic random access memory (DRAM), or ROM.

Turning to the contents of the memory 812 in more detail, the memory 812 may include an operating system 820, one or more data stores 815, and one or more application programs, modules, or services. The application 806 may be configured to receive, store, and/or display a network page or other interface for interacting with the service provider computers 810. Additionally, the memory 812 may store access credentials and/or other user information such as, but not limited to, user IDs, passwords, and/or other user information. In some examples, the user information may include information for authenticating an account access request such as, but not limited to, a device ID, a cookie, an IP address, a location, or the like.

The user devices 804 may also contain communications connection(s) 816 that allow the user devices 804 to communicate with a stored database, another computing device or server (e.g., the service provider computers 810), user terminals and/or other devices on the networks 808. The user devices 804 may also include I/O device(s) 818, such as a keyboard, a mouse, a pen, a voice input device, a touch input device, a display, speakers, a printer, etc.

In some aspects, the service provider computers 810 and the processing system computer(s) 850 may also be any suitable type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computers 810 and/or the processing system computer(s) 850 are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment. In some examples, the service provider computers 810 may be in communication with the user devices 804 and/or the processing system computer(s) 850 via the networks 808 or via other network connections. The service provider computers 810 and the processing system computer(s) 850 may separately include one or more servers, perhaps arranged in a cluster, as a server farm, or as individual servers not associated with one another. These servers may be configured to implement the functionality described herein as part of an integrated, distributed computing environment.

In one illustrative configuration, the service provider computers 810 may include at least one memory 828 and one or more processing units (or processor(s)) 830. The processor(s) 830 may be implemented as appropriate in hardware, computer-executable instructions, firmware, or combinations thereof. Computer-executable instruction or firmware implementations of the processor(s) 830 may include computer-executable or machine-executable instructions written in any suitable programming language to perform the various functions described.

The memory 828 may store program instructions that are loadable and executable on the processor(s) 830, as well as data generated during the execution of these programs. Depending on the configuration and type of service provider computers 810, the memory 828 may be volatile (such as RAM) and/or non-volatile (such as ROM, flash memory, etc.). The service provider computers 810 or servers may also include additional storage 832, which may include removable storage and/or non-removable storage. The additional storage 832 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 828 may include multiple different types of memory, such as SRAM, DRAM, or ROM.

The memory 828, the additional storage 832, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 828 and the additional storage 832 are all examples of computer storage media. Additional types of computer storage media that may be present in the service provider computers 810 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computers 810. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computers 810 may also contain communications connection(s) 834 that allow the service provider computers 810 to communicate with a stored database, another computing device or server, user terminals and/or other devices on the networks 808. The service provider computers 810 may also include I/O device(s) 836, such as a keyboard, a mouse, a pen, a voice input device, a touch input device, a display, speakers, a printer, etc.

Turning to the contents of the memory 828 in more detail, the memory 828 may include an operating system 840, one or more data stores 842, and/or one or more application programs, modules, or services for implementing the features disclosed herein, such as the features provided by the intelligent reframing engine 844 (an example of the intelligent reframing engine 102 of FIG. 1).

Figure 9:
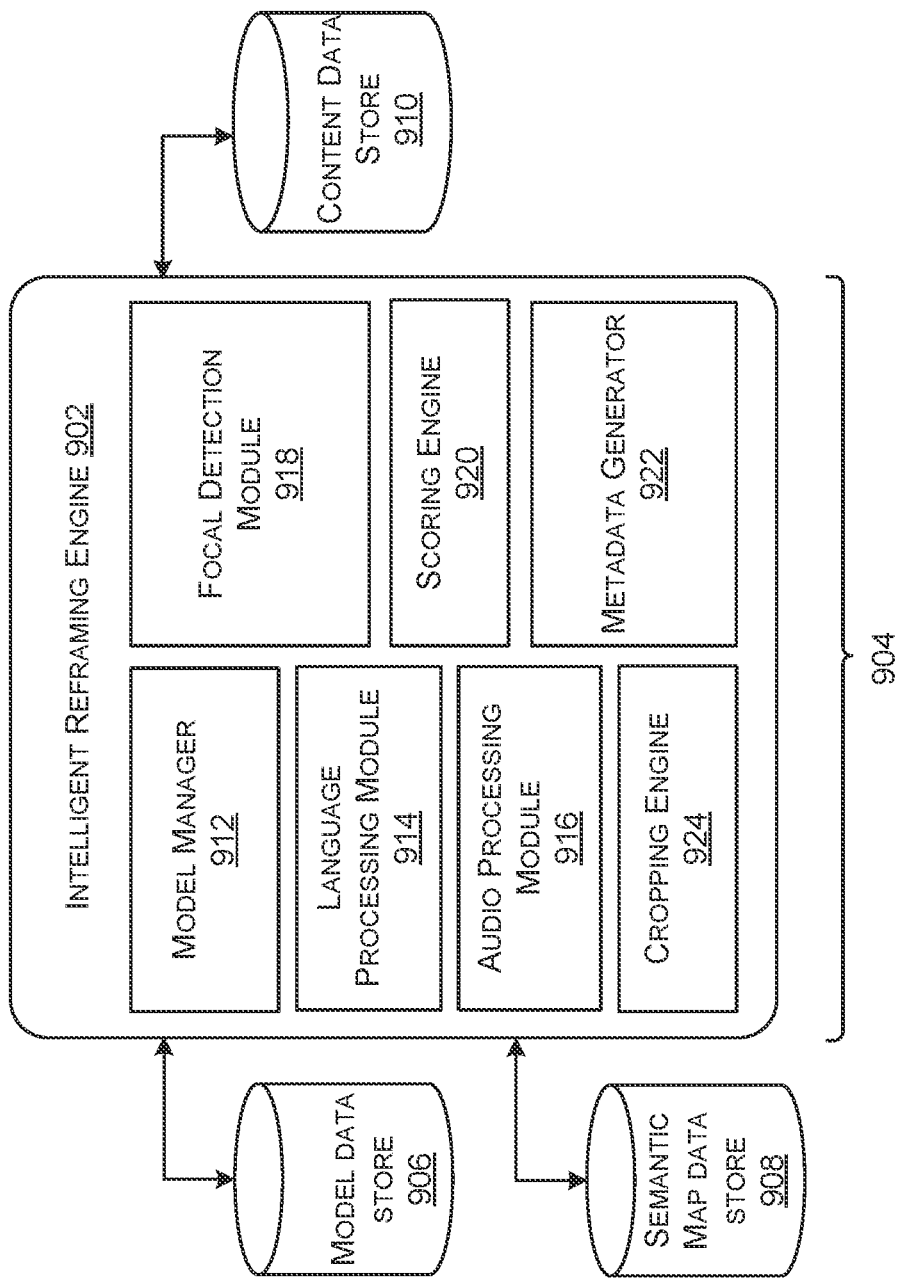
FIG. 9 is a schematic diagram of an example computer architecture for the intelligent reframing engine, including a plurality of modules that may perform functions in accordance with at least one embodiment.

FIG. 9 is a schematic diagram of an example computer architecture 900 for the intelligent reframing engine 902 (e.g., an example of the intelligent reframing engine 102 of FIG. 1), including a plurality of modules (e.g., modules 904) that may perform functions in accordance with at least one embodiment. The modules may be software modules, hardware modules, or a combination thereof. If the modules are software modules, the modules can be embodied on a computer readable medium and processed by a processor in any of the computer systems described herein. It should be noted that any module or data store described herein, may be, in some embodiments, be a service responsible for providing functionality corresponding to the module described below. The modules 904 may be exist as part of the intelligent reframing engine 902, or the modules 904 may exist as separate modules or services external to the intelligent reframing engine 902.

In the embodiment shown in the FIG. 9, data stores such as model data store 906, semantic map data store 908, and content data store 910 are shown, although data can be maintained, derived, or otherwise accessed from various data stores, either remote or local to the intelligent reframing engine 902, to achieve the functions described herein. The intelligent reframing engine 902, as shown in FIG. 9, includes various modules such as a model manager 912, the language processing module 914, the audio processing module 916, the focal point detection module 918, the scoring engine 920, the metadata generator 922, and the cropping engine 92. Some functions of the modules 912-924 are described below. However, for the benefit of the reader, a brief, non-limiting description of each of the modules is provided in the following paragraphs. In accordance with at least one embodiment, a process is enabled for identifying a focal point of an image.

The intelligent reframing engine 902 may include the model manager 912. The model manager 912 may be configured to perform the training phases 504 and/or 604 of FIGS. 5 and/or 6. In some embodiments, the model manager 912 may be configured to assess the accuracy of said models and/or to perform the feedback procedures 514 and/or 614 of FIGS. 5 and 6, respectively. In some embodiments, the model manager 912 may be configured to store the model(s) in model data store 906 for subsequent use. The model manager 912 may configured to provide the image (e.g., a video frame) as input to the model(s) 502 and receive the output provided by the model(s) (e.g., labels corresponding to the object(s), face(s), and/or action(s) identified as being present in the image). In some embodiments, the model manager 912 may receive as output from the model (or in some cases the model manager 912 may calculate) one or more additional attributes of the objects/faces/actions identified within the image. By way of example, these additional attributes may include a size, a position, a blurriness, a brightness, or any suitable visual attribute of the object/face/action. Labels corresponding to the identified object(s), face(s), and/or action(s) and any corresponding metadata may be stored as being associated with the image (e.g., a particular video frame of the content) within the content data store 910.

language processing module 914 may be configured to train and/or utilize the NLP model discussed above in connection to FIGS. 5 and 6. In some embodiments, the text samples may be stored in content data store 910 as being associated with particular content (and/or a set of video frames that includes every frame associated with the content). The language processing module 914 may be configured to determine the content associated with a particular image provided as input and retrieve the text sample(s) associated with the content. The language processing module 914 may configured to ascertain whether or not any keywords have been determined for the content and if not, the language processing module 914 may be configured to provide as input the text samples (collectively, or individually) to the NLP model and receive the output provided by the model (e.g., a number of keywords). In some embodiments, the language processing module 914 may be configured to execute any suitable parsing algorithm to parse the text sample(s) into corresponding parse trees from which keywords (e.g., nouns, verbs, etc.) may be identified. The keywords may be stored as being associated with the content and/or each image corresponding to the video frames of the content within the content data store 910.

Audio processing module 916 may be configured to train and/or utilize the audio processing model discussed above in connection to FIGS. 5 and 6. In some embodiments, audio content may be stored in content data store 910 as being associated with particular content (and/or a set of video frames that includes every frame associated with the content). The audio processing module 916 may be configured to determine an audio segment associated with a particular image (e.g., an audio segment corresponding to a time window such as 2 seconds before a run time corresponding to the image/video frame and 2 seconds after the run time corresponding to the image/video frame provided as input). The audio processing module 916 may configured to provide the audio segment as input to the audio processing model and receive the output provided by the model (e.g., a number of sounds detected within the audio segment). In some embodiments, the audio processing module 916 may receive as output from the model (or in some cases the audio process module 916 may calculate) one or more additional attributes of the sounds identified within the segment. By way of example, these additional attributes may include an index identifying a run time within the audio segment that corresponds to the sound, a loudness value indicating how loud the sounds was and/or a prevalence value indicating how loud the sound was in relation to other sounds occurring at the same time. Labels corresponding to the sounds and any corresponding metadata may be stored as being associated with the content and/or each image corresponding to the audio segment within the content data store 910.

The focal point detection module 918 may be configured to provide the image (e.g., a video frame identified by request) to the model manager 912, the language processing module 914, and/or the audio processing module 916 any may receive, as output from these modules, one or more labels and/or metadata associated with the labels identified as being present in the image. In some embodiments, the focal point detection module 918 may be configured to provide the image and labels to the metadata generator 922 and receive as output, metadata generated by the metadata generator 922 for those labels. The focal point detection module 918 may be configured to provide the outputs and/or any suitable metadata to the scoring engine 920 as input. The scoring engine 920 may be configured to score the labels according to predefined algorithms. In some embodiments, the scoring engine 920 may object a semantic map (e.g., a word map) from semantic map data store 908. In some embodiments, identifying the semantic map to retrieve may include matching one or more labels to a keyword associated with the semantic map. In some embodiments, the scoring engine 920 may be configured to identify a degree of relatedness between a label (e.g., corresponding to an object, face, action, keyword, or sound) and other labels identified for the image. The scoring engine 920 may be configured to assign a higher score to labels that are identified as corresponding to other labels identified for the image (e.g., from the image and/or the audio segment).

Additionally, or alternatively, the focal point detection module 918 may be configured to provide the outputs and/or any suitable metadata associated with the outputs as input to the focal point detection model 602 of FIG. 6 and may receive as output a focal point identified for the image. The focal point detection module 918 may store the focal point within the content data store 910 as being associated with the image. In some embodiments, the focal point detection module 918 may pass the focal point to any suitable of the other modules 904.

The metadata generator 922 may be configured to generate metadata associated with the visual and/or audio features identified from the image and/or a corresponding audio segment. In some embodiments, the metadata generator 922 may generate a size, a location, a blurriness value, a brightness value, a color, a loudness, a prevalence value (e.g., indicating a sound's relative loudness with respect to other sounds occurring at the same time), or any suitable attribute for the label identified from the image, audio segment, or text sample(s) associated with the image.

The cropping engine 924 may be configured to generate one or more new versions of the image based at least in part on one or more predefined aspect ratios. In some embodiments, the request may include the image and an identified one or more aspect ratios. If so, the cropping engine 924 may generate one or more versions of the image using the identified focal point for the image (provided by the focal point detection module 918 and/or retrieved from the content data store 910) in accordance with the one or more aspect ratios identified in the request. In some embodiments, the cropping engine 924 may generate a corresponding version of the image in every predefined aspect ratio defined. The cropped images (e.g., the newly generated versions of the image) may be stored in the content data store 910. Any suitable computing component (e.g., the service provider computers 810 of FIG. 8) may be configured to retrieve the images corresponding to a given aspect ratio (e.g., 16:9) to provide content in a particular aspect ratio (e.g., an aspect ratio either requested by a device or matched to the dimensions of a display of the device).

Figure 10:
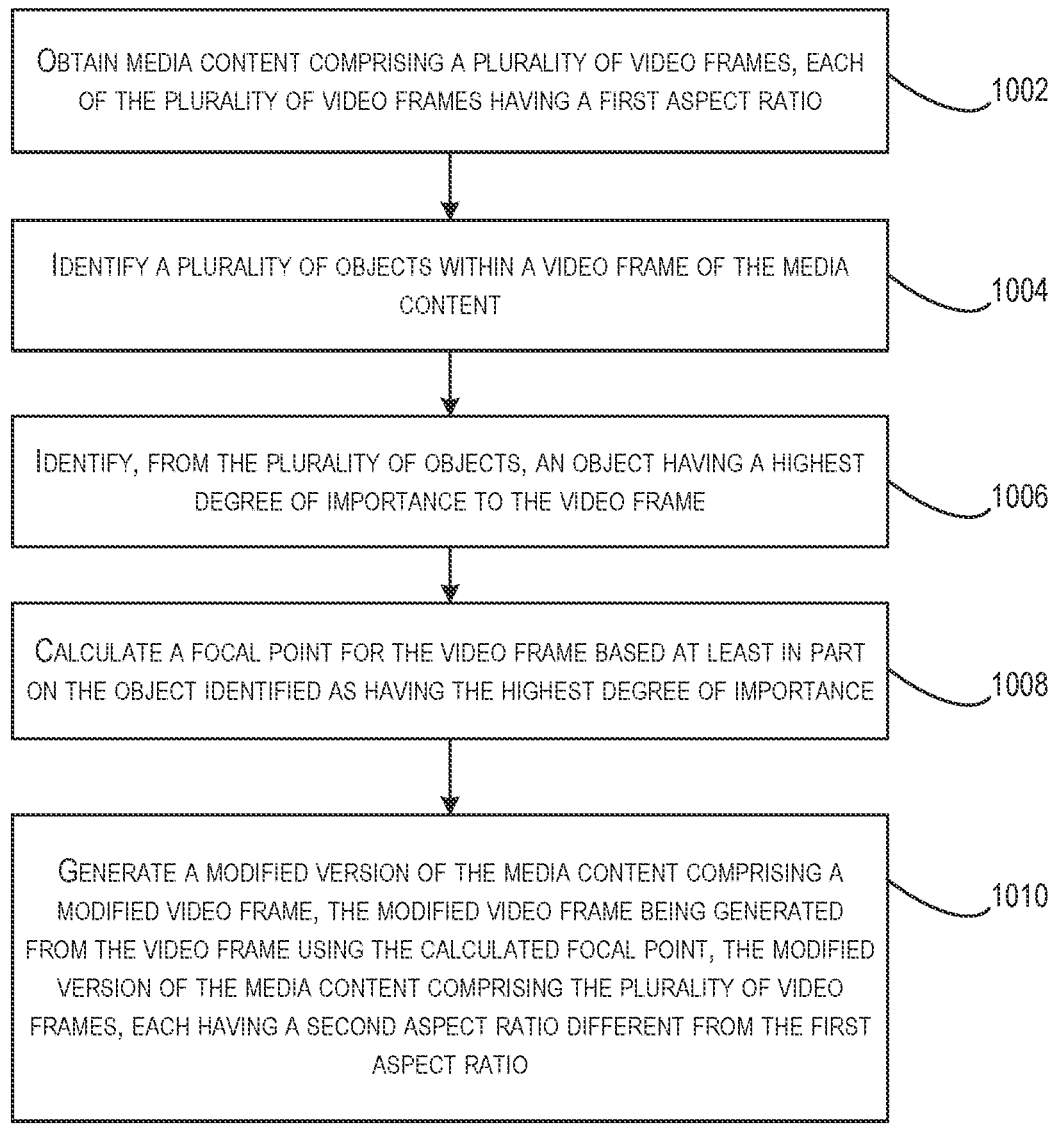
FIG. 10 is a flowchart illustrating another example method for providing interactive video utilizing the interactive video engine, in accordance with at least one embodiment.

FIG. 10 is a flowchart illustrating another example method 1000 for providing interactive video utilizing the interactive video engine, in accordance with at least one embodiment. A non-transitory computer-readable storage medium may store computer-executable instructions that, when executed by at least one processor, cause at least one computer to perform instructions comprising the operations of the method 1000. It should be appreciated that the operations of the method 1000 may be performed in any suitable, not necessarily the order depicted in FIG. 10. Further, the method 1000 may include additional, or fewer operations than those depicted in FIG. 10. The operations of method 1000 may be performed by the intelligent reframing engine 902 of FIG. 9. In some embodiments, the intelligent reframing engine 902 may execute on service provider computers 810 of FIG. 8.

The method 1000, may begin at 1002, where media content (e.g., a movie) comprising a plurality of video frames may be obtained (e.g., by the focal point detection module 918 of FIG. 9), each of the plurality of video frames having a first aspect ratio. The first aspect ratio corresponding to the dimensions of an original version of each of the plurality of video frames.

At 1004, a plurality of objects within a video frame of the media content may be identified. By way of example, the focal point detection module 918 may provide the image to the model manager 912 of FIG. 9 to identify labels corresponding to the plurality of objects identified within the video frame. The plurality of object being identified based at least in part on one or more of the model(s) 502 of FIG. 5.

At 1006, an object having a highest degree of importance to the video frame may be identified from the plurality of objects (e.g., by the focal point detection module 918 of FIG. 9). In some embodiments, the object may be deemed to have the highest degree of importance based at least in part on a score assigned to the label (e.g., by the scoring engine 920) and associated with object being the highest score of the scores assigned to the labels corresponding to the various objects, faces, and/or actions identified as occurring within the video frame. In some embodiments, a top n number of labels may be identified (e.g., a top 3, a top 4, the top label) (e.g., by the focal point detection module 918) based at least in part on the score assigned to the labels (e.g., by the scoring engine 920).

At 1008, a focal point for the video frame may be calculated (e.g., by the focal point detection module) based at least in part on the object identified as having the highest degree of importance (as assessed by the scores identified by the scoring engine 920 corresponding to each label that, in turn, corresponds to aa visual feature such as an object, face, and/or action occurring within the video frame).

At 1010, a modified version of the media content comprising a modified video frame may be generated (e.g., by the cropping engine 924 of FIG. 9). In some embodiments, the modified video frame may be generated from the video frame using the calculated focal point. The modified version of the media content may comprise the plurality of video frames, each having a second aspect ratio different from the first aspect ratio.

Figure 11:
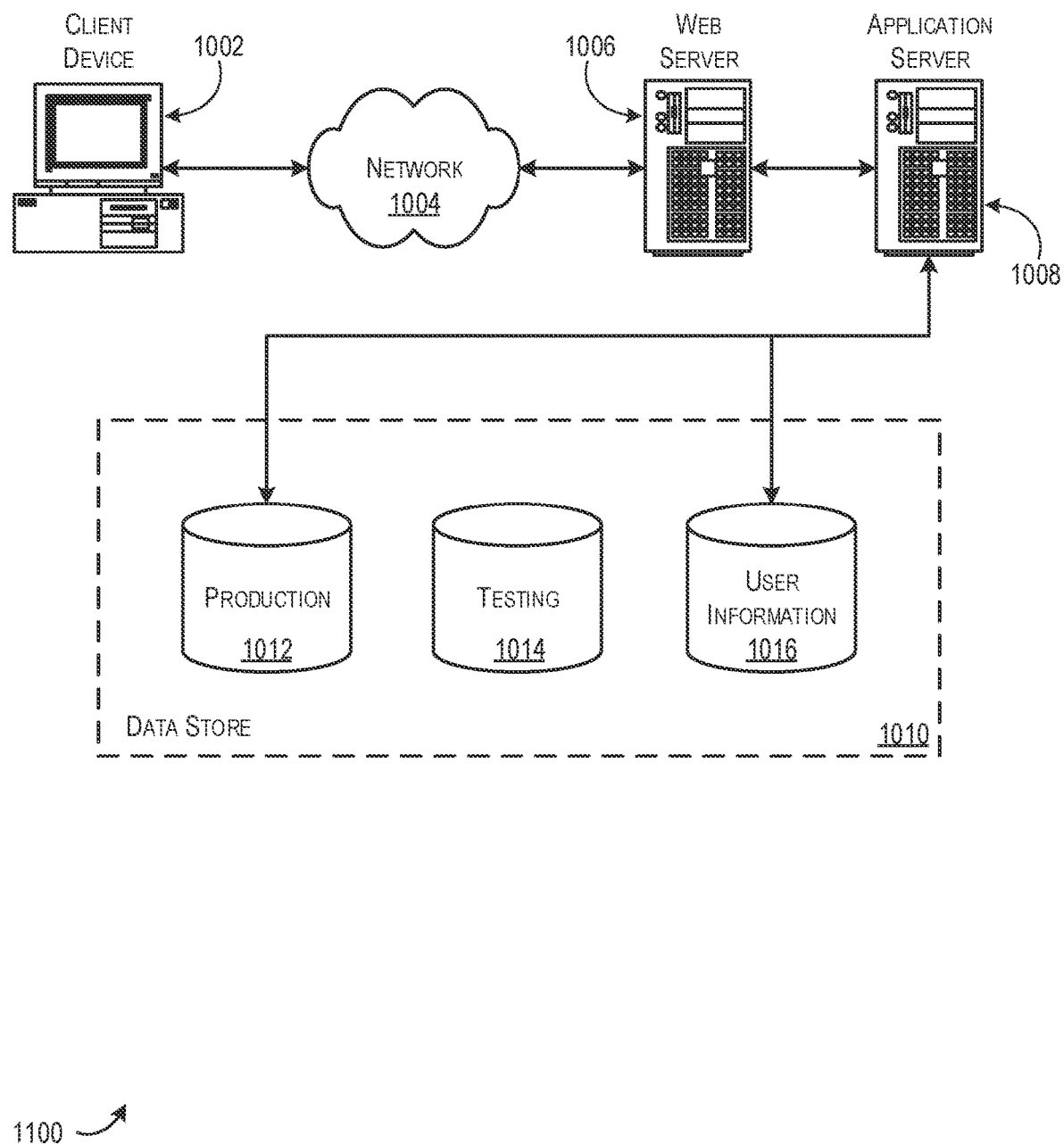
FIG. 11 illustrates an environment in which various embodiments can be implemented.

FIG. 11 illustrates aspects of an example environment 1100 for implementing aspects in accordance with various embodiments. As will be appreciated, although a Web-based environment is used for purposes of explanation, different environments may be used, as appropriate, to implement various embodiments. The environment includes an electronic client device 1102, which can include any appropriate device operable to send and receive requests, messages, or information over an appropriate network 1104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1102 and the application server 1108, can be handled by the Web server. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing production data 1112 and user information 1116, which can be used to serve content for the production side. The data store also is shown to include a mechanism for storing log data 1114, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above.

For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining media content comprising a plurality of video frames, each of the plurality of video frames having a first aspect ratio;
   identifying one or more labels for a video frame of the plurality of video frames, each label identifying a visual attribute appearing in the video frame, the visual attribute comprising an object, a face, or an action;
   generating metadata for each visual attribute, the metadata for each visual attribute comprising at least one of a size, a position, a brightness, or a blurriness of the visual attribute as it appears within the video frame;
   obtaining textual data describing the media content;
   identifying one or more keywords from the textual data based at least in part on one or more natural language processing techniques;
   generating a score for each visual attribute within the video frame of the media content based at least in part on a set of visual attributes of the video frame, the metadata for each visual attribute of the set of visual attributes, and the one or more keywords identified from the textual data;
   calculating a focal point for the video frame based at least in part on respective scores of the set of visual attributes of the video frame; and
   generating a modified version of the media content based at least in part on the focal point calculated for the video frame, the modified version of the media content comprising the plurality of video frames, each of the plurality of video frames having a second aspect ratio as part of the modified version of the media content.

2. The computer-implemented method of claim 1, wherein generating the modified version of the media content comprises cropping each video frame of the media content based at least in part on respective focal points calculated for each video frame.

3. The computer-implemented method of claim 1, further comprising:

obtaining an audio track corresponding to the media content;

segmenting the audio track into a plurality of audio segments of a predefined length, each of the plurality of audio segments corresponding to a set of video frames of the media content, the set of video frames comprising the video frame;

providing each audio segment as input to a machine-learning model trained to detect one or more audio attributes from an audio segment provided as input;

obtaining, as output from the machine-learning model, a set of audio attributes for each audio segment; and adding the set of audio attributes of an audio segment to the metadata associated with a set of video frames that correspond to the audio segment.

4. The computer-implemented method of claim 3, wherein an audio attribute of the set of audio attributes is associated with a prevalence score assigned by the machine-learning model that indicates a prevalence of the audio attribute within an audio segment from which it was detected.

5. The computer-implemented method of claim 1, further comprising:

obtaining a semantic map comprising nodes corresponding to objects and edges identifying relationships between pairs of the nodes;

identifying, from the semantic map, a relationship between two visual attributes of the video frame of the media content; and increasing respective scores for the two visual attributes based at least in part on identifying the relation.

6. The computer-implemented method of claim 1, wherein identifying the one or more labels for the video frame comprises providing the video frame to a plurality of machine-learning models, the plurality of machine-learning model comprising a first model trained to identify various objects, a second model trained to identify various faces, and a third model trained to identify various actions.

7. The computer-implemented method of claim 1, wherein calculating the focal point for the video frame comprises weighting the set of visual attributes of the video frame according to the respective scores.

8. A computing device, comprising
one or more processors; and
one or more memories comprising computer-readable instructions that, when executed by the one or more processors, causes the computing device to:
obtain media content comprising a plurality of video frames, each of the plurality of video frames having a first aspect ratio;
identify a plurality of objects within a video frame of the media content;
identify, from the plurality of objects, an object having a highest degree of importance to the video frame;
calculate a focal point for the video frame based at least in part on the object identified as having the highest degree of importance; and
generate a modified version of the media content comprising a modified video frame, the modified video frame being generated from the video frame using the calculated focal point, the modified version of the media content comprising the plurality of video frames, each having a second aspect ratio different from the first aspect ratio.

9. The computing device of claim 8, wherein executing the instructions further cause the computing device to generate a plurality of modified versions of the media content, each of the plurality of modified versions of the media content having a respective modified version of the video frame that is generated using the calculated focal point, wherein each of the plurality of modified versions of the media content has a different aspect ratio.

10. The computing device of claim 9, wherein executing the instructions further causes the computing device to:
receive a request for the media content from a user device having a display associated with a set of dimensions; and
select a particular modified version of the media content from the plurality of modified versions of the media content based at least in part on matching the set of dimensions of the display of the user device with a corresponding aspect ratio of the particular modified version of the media content.

11. The computing device of claim 8, wherein executing the instructions to calculate the focal point further cause the computing device to:
identify a focal object based at least in part on respective scores of the plurality of objects within the video frame;
set an initial focal point to correspond to the focal object; and
adjust the initial focal point based at least in part on at least one score of at least one other object of the plurality of objects within the video frame.

12. The computing device of claim 11, wherein executing the instructions to identify the plurality of objects within the video frame of the media content further causes the computing device to:
calculate metadata for each object, the metadata of an object comprising a size, a position, a brightness, or a blurriness of the object as it appears within a respective video frame; and
generate a score for each of the plurality of objects within the video frame, a respective score indicating an importance of a corresponding object, the respective score being calculated based at least in part on the metadata of the corresponding object, wherein identifying the focal object is based at least in part on the respective scores of the plurality of objects.

13. The computing device of claim 12, wherein executing the instructions further causes the computing device to calculate a frequency for the corresponding object within the video frame, the frequency quantifying a number of video frames in which the corresponding object appears within the media content, wherein the respective score for the corresponding object is calculated further based at least in part on the frequency.

14. The computing device of claim 8, wherein executing the instructions further causes the computing device to:
identify i) one or more faces within the video frame of the media content or ii) one or more actions depicted within the video frame of the media content; and
generate additional scores for the one or more faces or the one or more actions, wherein the focal point is calculated further based at least in part on the additional scores.

15. A non-transitory computer-readable storage medium comprising computer-readable instructions that, when executed by one or more processors of a computing device, cause the computing device to:
obtain media content comprising a plurality of video frames, each of the plurality of video frames having a first aspect ratio;

identify a plurality of visual features of a video frame of the media content;

identify, from the plurality of visual features, a set of visual features having the most importance to the video frame;

calculate a focal point for the video frame based at least in part the set of visual features having the most importance to the video frame;

generate a modified version of the video frame using the calculated focal point, the modified version of the video frame having a second aspect ratio different from the first aspect ratio; and provide the modified version of the video frame to a user device in response to a request for the media content.

16. The non-transitory computer-readable storage medium of claim 15, wherein generating the modified version of the video frame comprises cropping the video frame using the focal point as a center point for cropping the video frame.

17. The non-transitory computer-readable storage medium of claim 15, wherein each visual feature is an object, a face, or an action.

18. The non-transitory computer-readable storage medium of claim 17, wherein identifying the plurality of visual features of the video frame utilizes a plurality of corresponding machine-learning models each individually configured to identify a set of objects, a set of faces, or a set of actions from one or more video frames provided as input.

19. The non-transitory computer-readable storage medium of claim 15, wherein the focal point is calculated based at least in part on assigning varying priorities to each of the plurality of visual features, the focal point being skewed toward visual features having higher priorities.

20. The non-transitory computer-readable storage medium of claim 15, wherein executing the computer-readable instructions further causes the computing device to:

calculate metadata for each visual feature, the metadata of an attribute comprising at least one of a size, a position, a brightness, or a blurriness of the visual feature as it appears within a respective video frame; and identify a relationship between audio features of an audio segment associated with the video frame and at least one of the plurality of visual features of the video frame, wherein the focal point is calculated further based at least in part on corresponding metadata associated with each feature and the relationship between the audio features of the audio segment and the at least one visual feature of the video frame.

* * * * *